Patented Feb. 6, 1923.

1,444,484

UNITED STATES PATENT OFFICE.

EARL P. STEVENSON, OF CAMBRIDGE, MASSACHUSETTS, ASSIGNOR TO ARTHUR D. LITTLE, INC., OF CAMBRIDGE, MASSACHUSETTS, A CORPORATION OF MASSACHUSETTS.

METALLURGICAL PROCESS FOR TREATMENT OF ZINC COMPOUNDS.

No Drawing.   Application filed September 25, 1919.   Serial No. 326,283.

*To all whom it may concern:*

Be it known that I, EARL P. STEVENSON, a citizen of the United States, residing at Cambridge, in the county of Middlesex and State of Massachusetts, have invented certain new and useful Improvements in Metallurgical Processes for Treatment of Zinc Compounds; and I do hereby declare the following to be a full, clear, and exact description of the invention, such as will enable others skilled in the art to which it appertains to make and use the same.

The present invention relates to the treatment of zinc bearing materials and more particularly to a hydro-metallurgical process for extracting the zinc values from such sources, together with the resulting compound obtained at one stage of the process.

It is one object of the present invention to develop a method of treatment which economically and efficiently recovers substantially pure zinc values either as metallic zinc or in the form or zinc oxide from various forms of zinc compounds, whether in their natural occurrence or as the result of previous treatments.

The importance and desirability of such a process will be better appreciated when it is understood that pure zinc oxide free from contaminating traces of lead, cadmium, or other metals is widely used in industry at the present time, more particularly in connection with the manufacture of rubber goods. The pure zinc resulting from this method is also preferred for many uses over the ordinary commercial spelter and commands a substantially higher price in the market.

One feature of the present invention contemplates treating zinc mixtures with a hot concentrated solution of amonium sulphate to dissolve out the zinc values and subsequently cooling the solution in a manner to precipitate out a basic sulphate of zinc having a well defined crystalline structure.

According to the best method now known of practicing the invention, the ammonium sulphate should have a concentration of not less than 20 per cent and not more than 40 per cent by weight, and the reaction should be carried on in a closed vessel at a temperature of not less than 100° C., although it has been found that this temperature may vary from 100° C. to 150° C. Upon cooling this solution a basic sulphate of zinc is invariably precipitated. Thereafter the solution is filtered to separate the precipitate therefrom.

Under certain conditions the yield of basic sulphate may be increased by artificially hastening the cooling action, although it should be understood that this method of cooling is not essential to the formation of basic sulphate.

The basic sulphate of zinc resulting from the proper treatment with ammonium sulphate solution lends itself readily to a variety of further treatments for the production of merchantable products as, for example, pure zinc oxide and a commercial white pigment corresponding to lithopone.

In the process as actually practiced, a mixture in which zinc occurs either as an oxide, carbonate, or hydroxide is treated in a closed chamber with a solution of ammonium sulphate having about a 30 per cent concentration by weight and at a temperature of approximately 100° C. The duration of treatment depends upon the degree of fineness to which the mixture has been subdivided and the zinc values may be extracted almost instantaneously if the mixture has been prepared in the best manner. When the zinc values have been extracted from the mixture the solution is cooled, precipitating a basic sulphate of zinc having a well defined crystalline structure of plate-like form. The gangue material such as calcium carbonate, calcium sulphate, magnesia, alumina, etc., if such are present, is not dissolved by the ammonium sulphate. After the precipitation of the zinc sulphate, the ammonium sulphate is filtered off or otherwise separated and used again in cyclic repetition, it being necessary only to add a relatively small amount of the ammonium sulphate to replace that which may be carried down mechanically with the zinc compound and that which is converted into ammonia. Any ammonium sulphate which may be carried down mechanically with the precipitate is in large part removed by a subsequent washing of the precipitate. The ammonia generated in the preliminary stage of the treatment of the zinc mixture with ammonium sulphate may be collected and reconverted into sulphate so that substantially all of the ammonium sulphate is preserved for continued use.

If the zinc compound initially treated by the ammonium sulphate solution is in an impure state containing oxides of iron, cadmium, manganese, or copper, it may be desirable to remove the traces of these elements, which are dissolved together with the zinc, prior to the precipitation of the basic sulphate of zinc. These impurities in the zinc compound may be present when a naturally occurring sulphide or carbonate ore, for example, is converted into oxide by roasting. The impurities may be substantially completely removed from the hot solution of ammonium sulphate and the resulting basic sulphate freed from contamination by the following methods. If iron oxide is present in the zinc mixture as ferric oxide, which condition may always be obtained by proper roasting, then the oxide of iron will not dissolve in the ammonium sulphate. This also holds true of manganese, which if present as manganic oxide is not soluble in the solution of ammonium sulphate. In the case of manganese, however, this condition is more difficult to obtain through roasting and under certain conditions it may be advisable and necessary to add a suitable oxidizing agent to the hot extraction liquor to convert any manganous oxide which may be present into the corresponding manganic oxide or manganese dioxide. Ammonium persulphate appears to be preferable for this purpose although other oxidizing agents such as chlorine and calcium oxychloride (chloride of lime) may also be used. In case cadmium or copper is present in the zinc mixture initially treated, it will be dissolved by the ammonium sulphate along with the zinc but can be eliminated from the hot extraction liquor by treatment with metallic zinc which precipitates the cadmium, copper, and also silver according to well known metallurgical principles.

In case the zinc mixture or zinc ore initially treated contains lead in the form of an oxide this will be converted to lead sulphate which is insoluble in the ammonium sulphate. Ordinarily any lead which may be present in the sulphide ores as they occur naturally will be converted in whole or in large part into lead sulphate by the preliminary roasting of the sulphide ore.

It will thus be seen that a pure zinc compound may be obtained in a relatively inexpensive manner through treatment of certain zinc mixtures with a hot concentrated solution of ammonium sulphate and subsequent cooling or in the case of mixtures containing certain impurities, with an intermediate treatment of the hot solution to remove any traces of iron, manganese, cadmium, copper, or silver which may be present. This compound, owing to its stability and physical characteristics, lends itself readily to a variety of methods for the production of pure metallic zinc, zinc oxide, or other mechantable zinc compounds.

This stable compound of zinc, according to chemical analysis, has the following composition:

|  | Per cent. |
|---|---|
| Zinc oxide | 58.24 |
| Zinc sulphate | 28.87 |
| Water | 12.89 |
| Total | 100.00 |

From this analysis it is believed that the compound which is a basic salt of zinc should have the formula $4Zn(OH)_2 \cdot ZnSO_4$. It will be observed that the basic sulphate of zinc thus formed contains a higher percentage of zinc than is usual in zinc sulphates.

According to one method which may be practiced, the basic sulphate of zinc is subjected to a simple ignition or calcining process. It is found that when the basic sulphate is heated to a temperature of over 750° C. it decomposes into zinc oxide with an evolution of sulphur trioxide and sulphur dioxide, the ratio of the sulphur trioxide to the sulphur dioxide being a function of the temperature at which the decomposition takes place. The zinc oxide then remaining as a residue from this treatment is cooled and pulverized to produce a commercial and marketable product free from contaminating traces of other materials.

It should be understood that the term "basic sulphate" as used throughout the specification and claims is intended as defining the character of the zinc compound realized in the foregoing process and is based upon the analytical values above set forth.

I claim—

1. A process for the recovery of zinc values from materials containing zinc in the form of an oxide, hydroxide, carbonate, or mixtures of the same, which consists in treating the zinc bearing material with a hot solution of ammonium sulphate having a concentration of approximately 20 per cent or more by weight to dissolve out the zinc, cooling the solution to precipitate out a basic sulphate of zinc, and subsequently separating the precipitate from the solution.

2. A process for the recovery of zinc values from materials containing zinc in the form of an oxide, hydroxide, carbonate, or mixtures of the same, which consists in treating the zinc bearing material with a concentrated solution of ammonium sulphate at a temperature not less than 100° C. approximately to dissolve out the zinc, cooling the solution to precipitate out a basic sulphate of zinc and subsequently separating the basic sulphate from the solution.

3. A process for the recovery of zinc values from materials containing zinc in the form of an oxide, hydroxide, carbonate, or mixtures of the same, which consists in treating the zinc bearing material with a hot solution of ammonium sulphate at a temperature not less than 100° C. approximately to dissolve out the zinc, treating the solution while still hot with reagents to remove other metals from the solution, and finally cooling the solution to precipitate out a basic sulphate of zinc.

4. A process for the recovery of zinc values from materials containing zinc in the form of an oxide, hydroxide, carbonate, or mixtures of the same, which consists in treating the zinc bearing material with a hot solution of ammonium sulphate at a temperature not less than 100° C. approximately to dissolve out the zinc, treating the solution while still hot with an oxidizing agent to convert manganous oxide which is soluble in ammonium sulphate solution into an insoluble compound, and finally cooling the solution to precipitate out a zinc salt.

5. A process for the recovery of zinc values from materials containing zinc in the form of an oxide, hydroxide, carbonate, or mixtures of the same, which consists in treating the zinc bearing material with a hot solution of ammonium sulphate to dissolve out the zinc, treating the solution while still hot with ammonium persulphate to convert the manganous oxide which is soluble in ammonium sulphate solution into an insoluble compound, and finally cooling the solution to precipitate out a zinc salt.

6. A process for the recovery of zinc values from materials containing zinc in the form of an oxide, hydroxide, carbonate, or mixtures of the same, which consists in treating the zinc bearing material with a hot solution of ammonium sulphate at a temperature not less than 100° C. approximately to dissolve out the zinc, treating the solution while still hot with an oxidizing agent for the purpose of converting manganous oxide, which is soluble in ammonium sulphate solution into an insoluble compound, subjecting the hot solution to treatment with metallic zinc to precipitate cadmium, copper and silver thereon, and finally cooling the solution to precipitate out a zinc salt.

7. A process for the recovery of zinc values from materials containing zinc in the form of an oxide, hydroxide, carbonate, or mixtures of the same, which consists in treating the zinc bearing material with a hot solution of ammonium sulphate at a temperature not less than 100° C. approximately to dissolve out the zinc, cooling the solution to precipitate out a basic sulphate of zinc, separating the ammonium sulphate in solution from the precipitate, and calcining the precipitate to produce zinc oxide.

8. A basic sulphate of zinc having substantially the following composition: zinc oxide 58.24%, zinc sulphate 28.87% and water 12.89%.

EARL P. STEVENSON.